US005839444A

United States Patent [19]

Komatsu et al.

[11] Patent Number: 5,839,444

[45] Date of Patent: Nov. 24, 1998

[54] DEGLUTITION ASSISTING INSTRUMENT

[75] Inventors: Hiroyuki Komatsu; Kuniyuki Komatsu, both of Tokyo; Shigeru Ono, Kawasaki, all of Japan

[73] Assignee: Dental Aid Co. Ltd., Tokyo, Japan

[21] Appl. No.: 858,445

[22] Filed: May 19, 1997

[30] Foreign Application Priority Data

Jan. 28, 1997 [JP] Japan .................................... 9-014265

[51] Int. Cl.[6] ....................................................... A61C 5/14

[52] U.S. Cl. ............................................ 128/859; 128/861

[58] Field of Search ............................ 128/848, 859–862

[56] References Cited

U.S. PATENT DOCUMENTS 2,669,988 2/1954 Carpenter ................................ 128/861
3,139,088 6/1964 Galleher .................................. 128/859
3,867,770 2/1975 Davis ...................................... 434/185
5,666,973 9/1997 Walter .................................... 128/861

*Primary Examiner*—Michael A. Brown
*Attorney, Agent, or Firm*—Malcolm B. Wittenberg

[57] ABSTRACT

A deglutition assisting instrument is provided comprising:

a body in a form of a thin elastic plate for being inserted into and supported in a position between an inner lower portion of lower lip and outer surface of lower gum in oral cavity of a patient, and an operative member projecting from the body, wherein the instrument with the body being in the position allows closing of lips of the patient with the operative member extending out of the oral cavity between the lips, and wherein the body is moved following the movement of the operative member, thereby inducing a desired action in the oral cavity or giving stimulation within the oral cavity.

4 Claims, 3 Drawing Sheets

DEGLUTITION ASSISTING INSTRUMENT

FIELD OF THE INVENTION

This invention relates to a deglutition assisting instrument, more specifically, to a deglutition assisting instrument for mainly a patient with dysphagia and/or hypoptyalism who needs basic training.

BACKGROUND ART

Assistance for a patient with dysphagia in taking food is currently given in such a manner that an attendant opens the mouth of the patient, puts liquid food and the like with a spoon into the oral cavity, closes the mouth to prevent the food and saliva from dribbling out of the mouth and to promote swallowing action, and shakes the head of the patient suitably for passing food through the throat. Additionally, since the food is apt to remain inside the cheeks, the attendant puts water in the oral cavity of the patient and shakes his head to remove residual food out of the oral cavity.

However, such attendance to the patient with dysphagia, including opening of the mouth of the patient, forces the attendant backbreaking labor, leading to desperate fatigue of the attendant both mentally and physically.

Moreover, mere shaking of the head of the patient cannot induce swallowing action accompanied by secretion of saliva, and thus the food put into the oral cavity of the patient cannot sometimes be passed through the throat.

Alternatively, no instrument has ever been proposed for a basic training of a patient with dysphagia for recovering his mouth opening-closing ability.

SUMMARY OF THE INVENTION

The present invention has been made in consideration of these conventional problems. Accordingly, it is an object of the present invention to provide a deglutition assisting instrument which can induce swallowing action of a patient with dysphagia, and which can reduce the labor of an attendant to such patient.

It is another object of the present invention to provide a deglutition assisting instrument which can be used for basic training of a patient with dysphagia for recovering, for example, his mouth opening-closing ability.

According to the present invention, there is provided a deglutition assisting instrument comprising:

a body in a form of a thin elastic plate for being inserted into and supported in a position between an inner lower portion of lower lip and outer surface of lower gum in oral cavity of a patient, and an operative member projecting from said body, wherein said instrument with said body being in said position allows closing of lips of the patient with said operative member extending out of the oral cavity between the lips, and wherein said body is moved following the movement of the operative member, thereby inducing a desired action in the oral cavity or giving stimulation within the oral cavity.

A deglutition assisting instrument of the present invention has a body in the form of a thin elastic plate and an operative member projecting from the body.

The body of the instrument is so configured that it is inserted into and supported in a position between the inner lower portion of the lower lip and the outer surface of the lower gum in the oral cavity, i.e. in the vestibulum oris of the patient. The body is preferably in the shape of crescent, and curved generally to the curvature of the outer surface of the row of lower anterior teeth of the patient.

The operative member is projected outwardly from the surface of the body, preferably in the center portion thereof, more preferably in the upper middle portion thereof. When the body is curved as described above, the operative member is projected outwardly from the outer periphery of the curved surface of the body. The operative member may be formed integrally with the body, or may be formed separately and connected to the body in a suitable manner.

The instrument of the present invention, particularly the body, is essentially required of safety in use in the oral cavity. Therefore, at least the body of the instrument is made of an elastic material such as silicon, a fluorine-containing resin, rubber, or the like, and has a smooth surface without any sharp corners or edges which may hurt the inner wall of the oral cavity. It is preferred to form the operative member with the same elastic material as the body.

In use, the present instrument is put in position by inserting the body in a position between the inner lower portion of the lower lip and the outer surface of the lower gum (the gum on the lower jaw) (referred to as "fixed position" hereinbelow), so that the body is supported between the inner lower portion of the lower lip and the outer surface of the lower gum in the oral cavity. The operative member is projected out of the oral cavity between the lips, so that an operator may grasp the operative member for desired operation.

The instrument in the fixed position allows closing of lips of the patient with the operative member extending out of the oral cavity between the lips. This means that the entire configuration of the instrument does not prevent closure of lips of the patient, when the body of the instrument is put in the fixed position, with the operative member extending out of the oral cavity between the lips.

In one embodiment of the present invention, the body of the present instrument may have a lower edge portion thickened on the side having the operative member. When the instrument is placed in the fixed position, this thickened lower edge portion contacts the inner lower portion of the lower lip of the patient, and resist slipping of the body upwardly out of its fixed position, to thereby provide better support for the body and maintain the body in the fixed position. The thickened portion also has a smooth, rounded surface so that it will not hurt the inner lower portion of the lower lip in contact therewith.

In another embodiment of the present invention, the body of the instrument of the present invention may be sized such that the upper edge of the body, when it is placed in the fixed position, extends beyond the upper edge of the lower anterior teeth (margo incisivus) of the patient, specifically by about 1 to 3 mm. By configuring the body of the instrument so that the upper edge thereof is positioned at a higher level than that of the upper edge of the lower anterior teeth, leakage of food and saliva out of the oral cavity can be prevented. For a patient having no natural lower anterior tooth, the body may be sized such that the upper edge of the body is positioned at a higher position than the position where the upper edge of the natural lower anterior teeth should have been.

The present instrument may be operated by holding the operative member between fingers, and moving the member up and down, right and left, back and forth, or in combined directions as desired. The body is moved following the movement of the operative member, thereby inducing a desired action in the oral cavity or giving stimulation within the oral cavity. Specifically, the present instrument can make the mouth of the patient open and close, make his cheeks expand and contract, and apply a massage to desired portions in the oral cavity to indirectly stimulate salivary gland.

Examples of the operation of the present instrument are as follows:

(1) By moving the operative member up and down, with the body being held in the fixed position, the operator can move the lower jaw of a patient with the body of the instrument to open and close his mouth. Accordingly, the operator can easily open the mouth of the patient to put food in his oral cavity, and then easily close his mouth.

(2) By moving the operative member back and forth with the upper edge of the body being in contact with the inner surface of the upper lip, the operator can expand and contract the cheeks of the patient with the body of the instrument. Accordingly, the residual food inside the cheeks may be removed, and training for swallowing food can be carried out.

(3) By moving the operative member in a desired direction, the operator can apply a massage to desired portions in the oral cavity of the patient with the body of the instrument. Accordingly, salivary gland can be stimulated to promote secretion of saliva.

The instrument of the present invention is mainly directed for use by a patient with dysphagia (including a patient having difficulties in deglutition), but may be subjected to use by a patient who needs basic training for recovering his mouth opening-closing ability as well.

Further, the instrument of the present invention may be operated not only by an attendant, but also by a patient himself, by holding the operative member between his fingers.

PREFERRED EMBODIMENTS OF THE INVENTION

The present invention is now explained in more detail with reference to examples taken in conjunction with the attached drawings.

Figure 1:
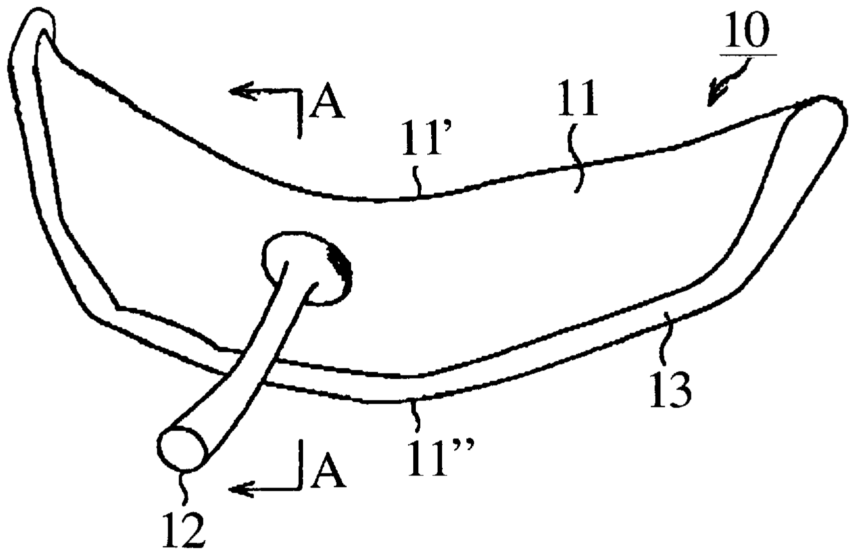
FIG. 1 is a perspective view of a deglutition assisting instrument of the present invention.
Figure 2:
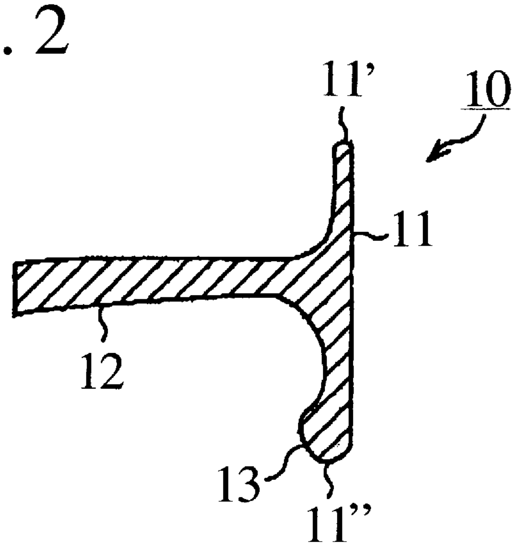
FIG. 2 is a cross-sectional view taken along line A—A in FIG. 1.

FIG. 1 is a perspective view illustrating a deglutition assisting instrument 10 of the present invention, and FIG. 2 is a cross-sectional view thereof taken along line A—A in FIG. 1. The deglutition assisting instrument 10 has a body 11 formed of a thin elastic plate generally in the shape of a crescent, and curved generally to the curvature of the outer surface of the row of lower anterior teeth, and an operative rod 12 projecting outwardly from the upper middle portion of the outer curved surface of the body 11. The body 11 and the rod 12 are formed integrally of an elastic silicon material, and have a smooth surface. Thus, the deglutition assisting instrument 10 elastically maintains its shape as illustrated in the drawings.

The lower edge portion 11" of the body 11, which is curved generally in an arc, is thickened to form a ridge 13 protruding outwardly a little, i.e. protruding on the same side as the operative rod 12. The ridge 13 has a generally semicircular cross-sectional shape as shown in FIG. 2 so that it will not hurt skin and mucosa in the oral cavity. Not only the ridge 13, but also other portions of the body 11, such as the upper edge 11', have rounded edges (see FIG. 2), so that the portions have no corners or edges that may hurt the inner wall of the oral cavity. Accordingly, along with the elasticity of the material, this ensures safety of the instrument upon its use in the oral cavity.

Figure 3:
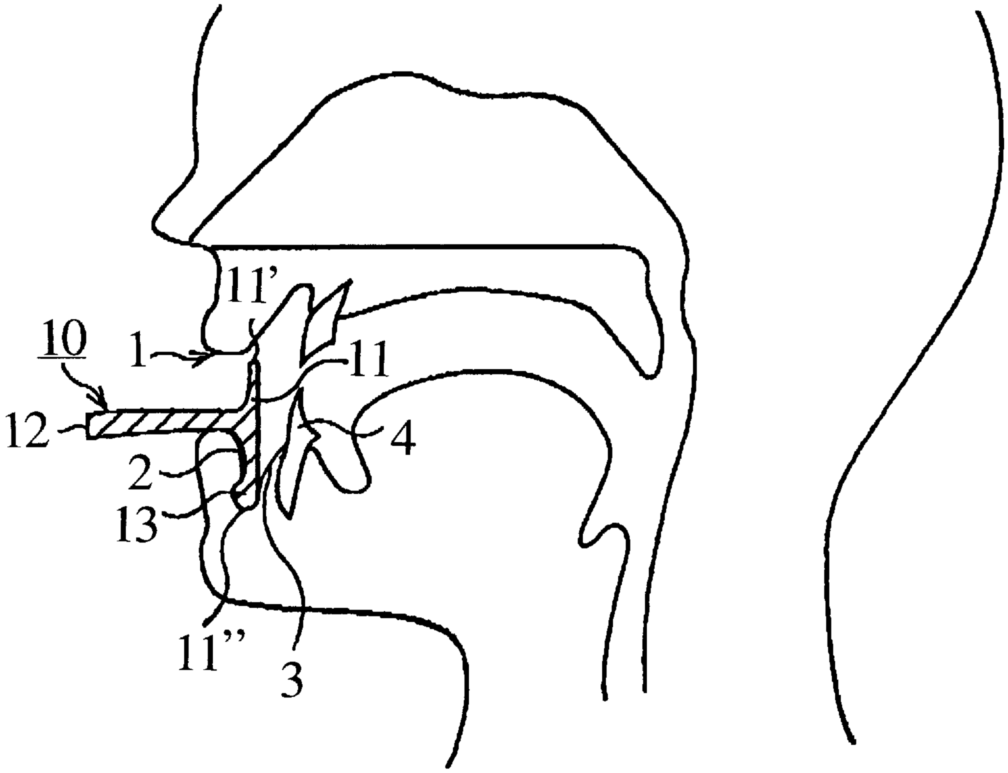
FIG. 3 is an illustrative view showing the state of the deglutition assisting instrument placed in the fixed position in the oral cavity of a patient.

FIG. 3 is an explanatory view illustrating the deglutition assisting instrument 10 placed in the fixed position in the mouth of a patient with dysphagia. The body 11 of the instrument 10 is inserted between the inner lower portion of the lower lip 2 and the outer surface of the lower gum 3, i.e. in the vestibulym oris of the patient, with the operative rod 12 extending out of the oral cavity between the lips, until the lower edge 11" of the body reaches the bottom of the vestibulum oris, or until the rod 12 touches the lower lip. The body 11 of the instrument 10 is held loosely and supported in this position.

Figure 4:
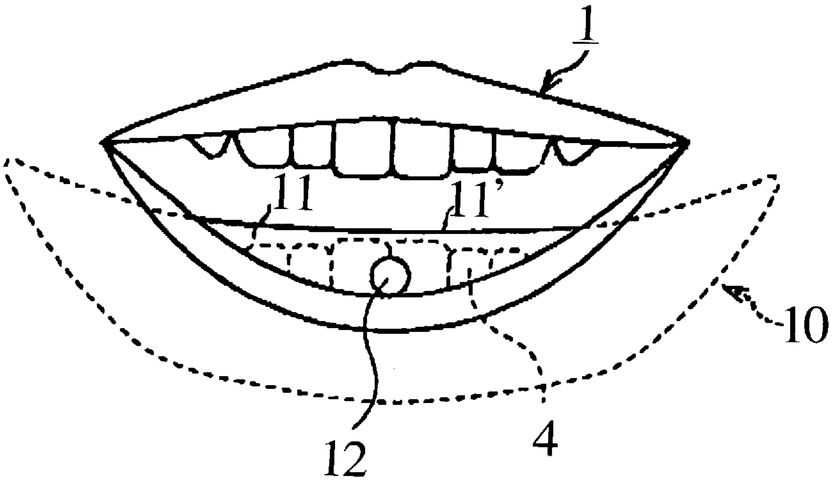
FIG. 4 is a schematic front view showing the deglutition assisting instrument positioned in the oral cavity of a patient.

With the instrument 10 in this fixed position, the body 11 covers the entire front surface of the row of the lower anterior teeth 4 of the patient as shown in FIG. 4, with the upper edge 11' of the body 11 extending beyond the upper edge of the lower anterior teeth 4 by about 2 to 3 mm. Also in this position, the right and left ends of the body 11 are positioned near the back teeth (not shown) of the patient. It is possible for the patient to close his lips completely with the operative rod 12 extending outwardly between the lips.

The basic operation of the deglutition assisting instrument 10 may be made by an attendant. He holds the operative rod 12 between his fingers, and moves it up and down, right and left, back and forth, or in combined directions as desired. By this operation, the attendant may open and close the patient's mouth, expand and contract his cheeks, or apply a massage to desired portions in his oral cavity to stimulate salivary gland, with the body 11 of the instrument following the movement of the rod 12, thereby causing desired movement of his mouth, or giving desired stimulation within his mouth.

One example of usage of the deglutition assisting instrument of the present invention for inducing swallowing action is now explained. First, the attendant moves the operative rod 12 downwards to draw the lower jaw of a patient downwards along with the body 11 of the instrument, thereby opening the mouth 1 of the patient. In this state, he may put food into the oral cavity of the patient with a spoon. Then he moves the rod 12 upwards to draw up the lower jaw along with the body 11, thereby closing the mouth 1 of the patient. During this upward movement of the instrument, the ridge 13 contacts the inner lower portion of the lower lip 2 of the patient to resist upward slipping of the body 11 out of the position.

Figure 5:
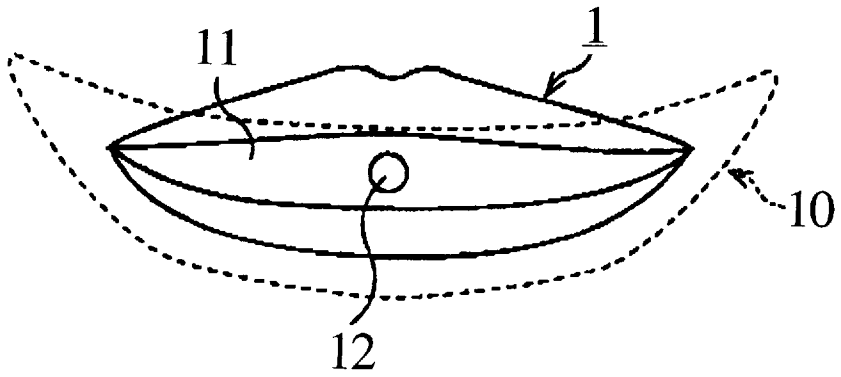
FIG. 5 is a schematic front view showing a mouth of a patient before it is closed completely with the deglutition assisting instrument in his mouth.

Here, as shown in FIG. 5, the body 11 covers and closes the opening of the mouth even when the lips are not closed completely, thereby ensuring prevention of leakage of the food and saliva out of the oral cavity.

Next, the attendant suitably moves the operative rod 12 to stimulate the salivary glands of the patient with the body 11 for inducing secretion of saliva, or to apply massage to desired portions in the oral cavity, thereby inducing swallowing action. Further, through the back-and-forth movement of the operative rod 12 and thus the body 11, the cheeks of the patient may be expanded or contracted, to thereby prevent food from remaining inside the cheeks, and to promote swallowing of the food.

As stated above, the deglutition assisting instrument of the present invention may be put in position in the oral cavity of a patient by inserting the body of the instrument between the inner lower portion of the lower lip and the outer surface of the lower gum, with the operative member extending out of the oral cavity between the lips. Then the operative portion is held by the operator between his fingers, and suitably moved up and down, right and left, back and forth, or in the combined directions. Accordingly, the body of the instrument moved following the movement of the operative member can open and close the mouth of the patient with dysphagia, expand and contract his cheeks, stimulate his salivary glands, or apply a massage to desired portions in the oral cavity, thereby inducing swallowing action. Therefore, the load on the attendant can be greatly reduced.

Further, this instrument may also be used as a tool for basic training, for example, for recovering mouth opening-closing action of a patient with dysphagia.

Although the present invention has been described with reference to the preferred embodiment, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A deglutition assisting instrument comprising:

a body in a form of a thin elastic plate for being inserted into and supported in a position between an inner lower portion of a lower lip and outer surface of a lower gum in an oral cavity of a patient, and an operative member projecting from said body, wherein said instrument with said body being in said position allows closing of the lips of the patient with said operative member extending out of the oral cavity between said lips, wherein said body is moved following the movement of the operative member, thereby inducing a desired action in the oral cavity or giving stimulation within the oral cavity, wherein said body has a surface and a lower edge portion thickened and extending outwardly of said surface, wherein said thickened portion is on the same side as the operative member, and wherein said body is sized such that an upper edge of the body slightly beyond an upper edge of lower anterior teeth of the patient when it is placed in said position.

2. The deglutition assisting instrument as claimed in claim 1 wherein said body is curved generally to the curvature of an outer surface of a row of lower anterior teeth, and wherein said operative member projects from outer periphery of the curved surface of the body.

3. The deglutition assisting instrument as claimed in claim 1 wherein said body is generally in the shape of a crescent.

4. The deglutition assisting instrument as claimed in claim 1 wherein said operative member projects from the body generally in the center thereof.

* * * * *